(12) United States Patent
Eichhorn et al.

(10) Patent No.: US 7,086,217 B2
(45) Date of Patent: Aug. 8, 2006

(54) ROPE OF SYNTHETIC FIBER WITH REINFORCEMENT ELEMENT FOR FRICTIONALLY ENGAGED POWER TRANSMISSION AND ROPE OF SYNTHETIC FIBER WITH REINFORCEMENT ELEMENT FOR POSITIVELY ENGAGED POWER TRANSMISSION

(75) Inventors: Roland Eichhorn, Oberkulm (CH); Karl Weinberger, Cham (CH)

(73) Assignee: Inventio AG, Hergiswil (CH)

( * ) Notice: Subject to any disclaimer, the term of this patent is extended or adjusted under 35 U.S.C. 154(b) by 62 days.

(21) Appl. No.: 10/694,378

(22) Filed: Oct. 27, 2003

(65) Prior Publication Data

US 2004/0083707 A1 May 6, 2004

(30) Foreign Application Priority Data

Jan. 11, 2002 (EP) ................................. 02405933

(51) Int. Cl.
*D02G 3/02* (2006.01)
(52) U.S. Cl. .......................................... 57/241; 57/236
(58) Field of Classification Search .................. 57/200, 57/210–213, 215, 217, 221, 223, 230, 232, 57/236, 241
See application file for complete search history.

(56) References Cited

U.S. PATENT DOCUMENTS

| | | | | |
|---|---|---|---|---|
| 4,534,163 | A | * 8/1985 | Schuerch | 57/233 |
| 4,724,929 | A | * 2/1988 | Coleman et al. | 187/411 |
| 5,605,036 | A | * 2/1997 | Onuma et al. | 57/212 |
| 5,651,572 | A | * 7/1997 | St. Germain | 294/74 |
| 5,881,843 | A | 3/1999 | O'Donnell et al. | |
| 6,364,063 | B1 | 4/2002 | Aulanko et al. | |
| 6,508,051 | B1 | * 1/2003 | De Angelis | 57/223 |
| 6,672,046 | B1 | * 1/2004 | Prewo et al. | 57/232 |

FOREIGN PATENT DOCUMENTS

| | | |
|---|---|---|
| EP | 0 672 781 | 9/1995 |
| EP | 1 061 172 | 12/2000 |
| WO | WO 98/29327 | 7/1998 |

* cited by examiner

*Primary Examiner*—Shaun R. Hurley
(74) *Attorney, Agent, or Firm*—Butzel Long

(57) ABSTRACT

A rope apparatus includes two ropes of synthetic fiber strands arranged for taking up force applied in a lengthwise direction. The ropes are arranged a predetermined distance apart and are fixed by a rope sheathing forming a fixed link running in the lengthwise direction between the two ropes. The rope apparatus also has at least one reinforcement element for the mechanical reinforcement of the rope sheathing.

23 Claims, 4 Drawing Sheets

ROPE OF SYNTHETIC FIBER WITH REINFORCEMENT ELEMENT FOR FRICTIONALLY ENGAGED POWER TRANSMISSION AND ROPE OF SYNTHETIC FIBER WITH REINFORCEMENT ELEMENT FOR POSITIVELY ENGAGED POWER TRANSMISSION

BACKGROUND OF THE INVENTION

The present invention concerns a rope of synthetic fiber with several ropes running parallel and spaced apart with a common rope sheathing, e.g., for use in an elevator installation.

Running ropes are in the conveying technology, in particular in the case of elevators, in the crane construction and in the mining industry, an important highly strained machine element. Particularly, the strain in driven ropes is multi-layered, as they are used, for example, with cranes and elevators.

In the case of conventional elevator installations, the car sling and a counterweight are connected to each other through several steel stranded ropes. In order to lift and lower the car and the counterweight, the ropes run over a driving disk, pulley or sheave, which is driven by a drive motor. The driving torque generated by the drive motor is, under frictional engagement, impressed on the rope section, which respectively contacts the driving sheave at a belt wrap: At the same time, the ropes experience tensile stress, bending stress, compressive strain and torsional stress. The relative motions, originating from the inflection upon the pulley, give rise to friction within the rope structure, which can, depending upon the lubricant concentration, negatively affect the rope wear. Depending upon rope construction, bending radius, groove profile and rope safety factor, the emerging primary and secondary stresses have a negative influence on the condition of the rope.

Apart from the strength requirements and in addition for energy reasons, in the case of cranes and elevators the demand exists for small rope masses, if possible. High-strength ropes of synthetic fiber, as for example made of aromatic polyamide, in particular aramides, with high-grade oriented molecular chains, fulfil these requirements better than steel ropes, however they have a lower transverse strength.

Consequently, in order to expose the aramide fibers when running over the driving disk to the lowest possible transverse strength, for example in the European patent document EP 0 672 781 A1 is suggested a parallel turned aramide fiber stranded rope, which is suitable as driving rope. The well-known aramide rope, shown in the European patent document EP 0 672 781 A1, offers very satisfying values regarding life span, higher abrasion resistance and fatigue strength under reversed bending stresses; however, in case of unfavorable circumstances, the possibility exists that in the case of parallel stranded aramide ropes, partial rope untwisting features appear, which disturb the original rope structure lasting in their balance. These torsional effects and the changes of the rope structure can be avoided, for example, with a rope of synthetic fiber in accordance with the European patent application EP 1 061 172 A2. For this purpose, the rope of synthetic fiber comprises two parallel running ropes, which are connected to each other through a rope sheathing. The rope of synthetic fiber, in accordance with EP 1 061 172 A2, attains a longitudinal strength essentially through the characteristics of both the parallel running ropes. On the other hand, the rope sheathing prevents the torsional effects and changes of the rope structure. In addition, the rope sheathing serves as isolation (protective effect) and it exhibits a high coefficient of friction.

A weak point can be, depending upon the planned use and range of application, the fixed link of such a rope of synthetic fiber in accordance with EP 1 061 172 A2.

SUMMARY OF THE INVENTION

The present invention pursues the goal of further improving the well-known ropes made of synthetic fibers in order to avoid, among other things, a fixed link rupture.

In particular, it is a problem definition of the present invention to further improve the functionality of ropes of synthetic fibers.

This goal is achieved, in accordance with the present invention, by means of a rope assembly of synthetic fibers that includes two ropes of synthetic fiber strands arranged for taking up force applied in a lengthwise direction. The ropes are arranged a predetermined distance apart and are fixed by a rope sheathing forming a fixed link running in the lengthwise direction between the two ropes. The rope apparatus also has at least one reinforcement element for the mechanical reinforcement of the rope sheathing. The at least one reinforcement element is attached to the rope sheathing and exposed at an outer surface of the rope assembly.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
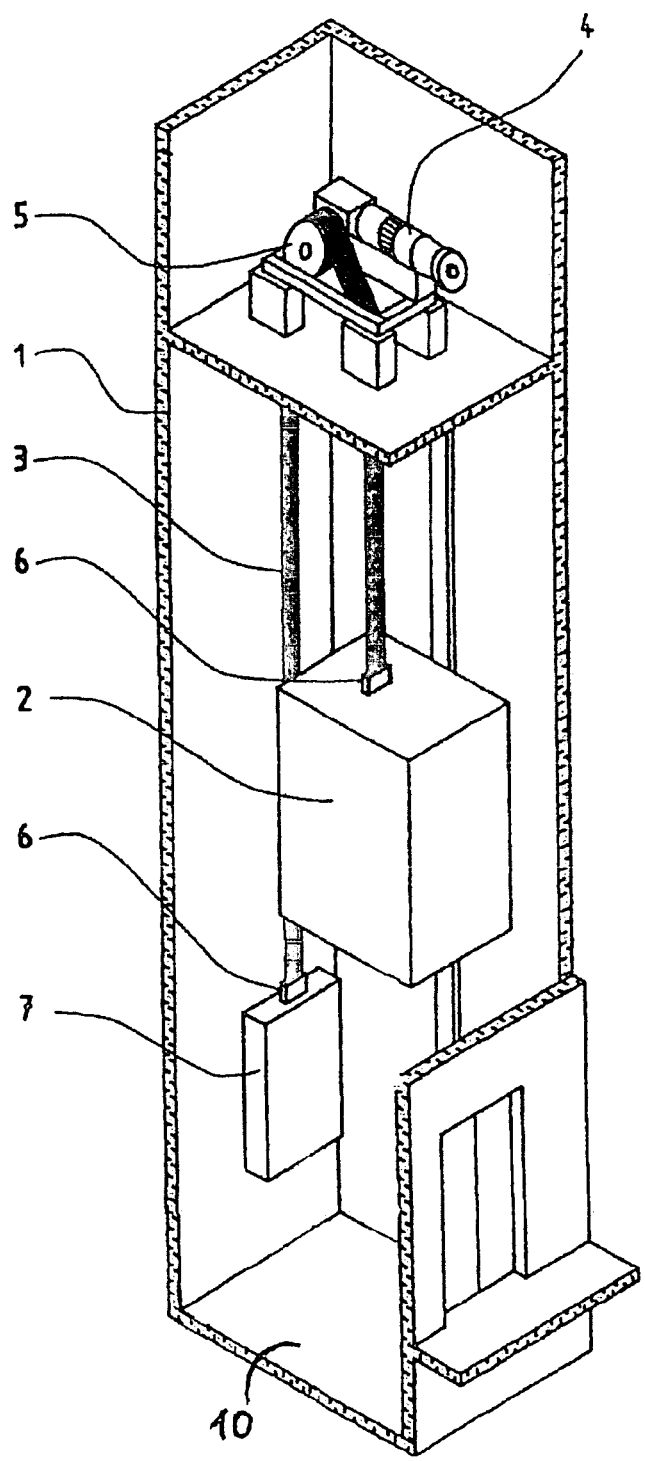
FIG. 1 is a perspective schematic view of an elevator installation with a car connected with a counterweight through stranded ropes of synthetic fiber in accordance with the present invention.

In accordance with FIG. 1, a car 2 guided in a hoistway 1 is suspended on a carrying rope assembly of synthetic material 3 according to the present invention, and such carrying rope 3 comprises, preferably, aramide fibers and runs upon a driving disk, pulley or sheave 5, which is connected with a drive motor 4. On a top of the car 2 is mounted an end of rope connection 6, at which the rope assembly 3 is fastened at one end thereof. Another end of the rope assembly 3 is fastened in the same way to a counterweight 7, which is likewise guided in the hoistway 1. The shown arrangement is a so-called 1:1 suspension, distinguished by the fact that the rope assembly 3, according to the present invention, is bent only in one direction, since it only rotates around a single driving disk 5, without rotating around other disks, as this is for example known as a 2:1 suspension.

The low weight of ropes of synthetic material provides the advantage that, in case of elevator installations, the use of usual compensation ropes can be completely or partially abandoned. When compared with conventional steel ropes, the maximal hoisting height of an elevator installation can thereby be increased or however, the maximal permissible load with the same rope dimensions can be raised.

It is possible that, however, a compensation rope can be provided despite the use of light ropes of synthetic material. Such a compensation rope (not shown) is then connected in a similar way with its first end at the bottom of the car 2 from where it leads around a deflection sheave (not shown) placed on a hoistway floor 10 to the counterweight 7.

Figure 2:
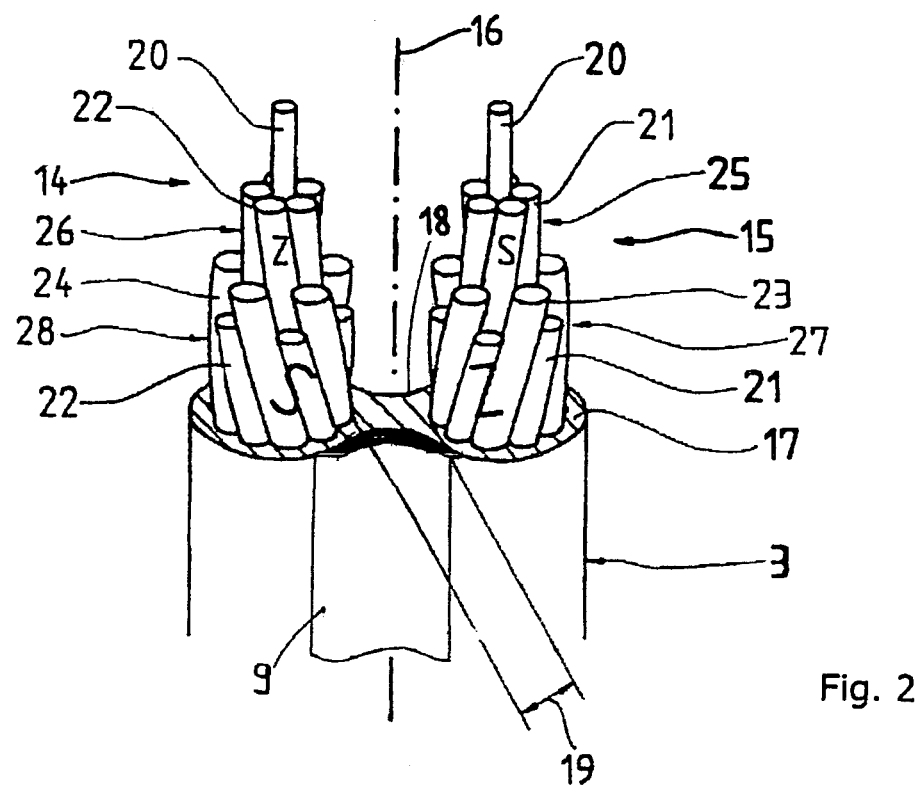
FIG. 2 is a perspective fragmentary view of a first embodiment of a rope assembly of synthetic material (twin rope) in accordance with the present invention.

The rope assembly 3 for use in an elevator installation is shown in more detail in FIG. 2. The rope of synthetic fiber 3 is a twin rope having two ropes 14 and 15 of synthetic fiber strands, strands 20, 22 and 24 in the rope 14 and strands 20, 21 and 23 in the rope 15, which are arranged for the taking up of forces in lengthwise direction. The ropes 14, 15 are arranged parallel, spaced apart a distance 19, along a lengthwise direction 16 of the twin rope of synthetic fiber 3. The ropes 14, 15 are fixed relative to each other in a firm torsional manner by a common rope sheathing 17. The rope sheathing 17 forms a fixed link 18 running in the lengthwise direction 16 of the twin rope assembly 3 between the two ropes 14, 15. In accordance with the present invention, the twin rope of synthetic fiber 3 includes a reinforcement element 9 for the mechanical reinforcement of the rope sheathing 17. In the case of the twin rope 3 shown in FIG. 2, the reinforcement element 9 is arranged within the area of the link 18 and runs parallel to the lengthwise direction 16 of the rope 3 with an oblong or strip shape.

General materials are applicable as material for the mentioned reinforcement element 9 and such general materials that are suitable for structure reinforcement, are for example aramide, polyester, fiberglass, carbon fibers or the like.

In connection with the present invention, the twin rope assembly 3 can be used as described for example in the European patent application EP 1 061 172 A2, mentioned above. Such a twin rope is constituted from the two ropes of synthetic fiber 14 and 15 arranged at the distance 19 parallel to each other, which, by means of the rope sheathing 17 jointly surrounding them, are fixed in their position to each other and in particular in a firm torsional manner. The ropes 14, 15 can be produced by two or multiple-stage twisting of turned rope produced from rope strands, whereby in the last stage, two layers 25, 26, 27, 28 or more layers of rope strands 20, 21, 22, 23, 24 are stranded with one another.

According to the present invention, the two ropes of synthetic fiber 14, 15 differ with regard to their twist direction, which is typically designated with "S" and "Z". A twist running in a helical line shape is designated with an "S" direction of rotation, which follows the form of the letter "S". It behaves accordingly in the case of a twisting with a "Z" turn or direction of rotation.

In the rope 14, for example, rope yarns made of aramide fibers with the "S" twist can be stranded into strands 22, 24 with a "Z" twist. In the first strand layer 26, five of such strands 22 with "Z" twist are laid in the rope with an "S" twist around the central core strand 20. In the second strand layer 28, an additional five of these strands 22 are stranded with five of the larger diameter strands 24 with a "Z" twist in a parallel lay. Together they form a twisted double-ply stranded rope, i.e. the rope 14 with an "S" twist.

The construction of the rope 15 is in the shown embodiment equal to that of the rope 14; of course, with the opposite twist directions "S" and "Z". Similarly, in the rope 15, are rope yarns of synthetic fiber with the "Z" twist stranded to strands 21, 23 with the "S" twist. These strands 21, 23 with the "S" twist are stranded in the two layers 25, 27 to form the rope 15 with the "Z" twist.

In the second strand layer 27, the larger diameter strands 23 lay partly in the valleys of the first strand layer 25 carrying them, while the five strands 21 lay on the summits of the first strand layer 25 carrying these and in so doing they fill in the gaps between the respectively adjacent larger diameter strands 23. In this way, the double-ply parallel stranded ropes 14, 15 have an almost cylindrical outer contour.

As to be recognized in FIG. 2, the entire outer perimeter of the ropes 14 and 15 is enveloped by the rope sheathing 17 of synthetic material. The following synthetic materials are particularly suitable as rope sheathing: rubber, polyurethane, polyolefin, polyvinyl chloride and polyamide. The elastic ductile synthetic material is preferably applied to the ropes 14 and 15 by spraying or any other suitable method, extruded and compression is applied. In this manner, the rope sheathing material penetrates from the outside into all gaps between the strands 22, 24 at the outer circumference and fills in these gaps. The so created link 18 of the rope sheathing 17 at the ropes 14 and 15 is so firm that only small relative motions occur between the strands 22, 24 of the ropes 14, 15 and the rope sheathing 17. The rope sheathing 17 defines the distance 19 between both stranded ropes 14, 15 with the bridging connecting fixed link 18, which acting as a torque bridge originating from the axial load of the rope of synthetic fiber 3, mutually compensates opposite directed torques of the ropes 14, 15 caused by the construction of the rope and thus, upon the bulk cross section of the rope of synthetic fiber 3, creates a torque compensation between the sum of all right-handed and all left-handed stranded parts.

The rope assembly 3, in accordance with the present invention, includes, as a component of the rope sheathing 17, at least the oblong shaped reinforcement element 9, which extends parallel to the lengthwise direction 16 of the rope of synthetic fiber 3. In the example shown in FIG. 2, the rope sheathing 17 forms, together with the two ropes 14, 15, a dumbbell-shaped arrangement. The oblong shaped reinforcement element 9 is formed in such a way that it fits in into one of the recesses at the fixed link 18. The reinforcement element 9 can be placed upon the surface of or integrated into the rope sheathing 17. Preferably, two such reinforcement elements 9 are arranged symmetrically in the opposing recesses of the link 18. A reinforcement element made of aramide, which improves the transverse strength of the entire rope of synthetic fiber 3, is particularly suitable.

Figure 3:
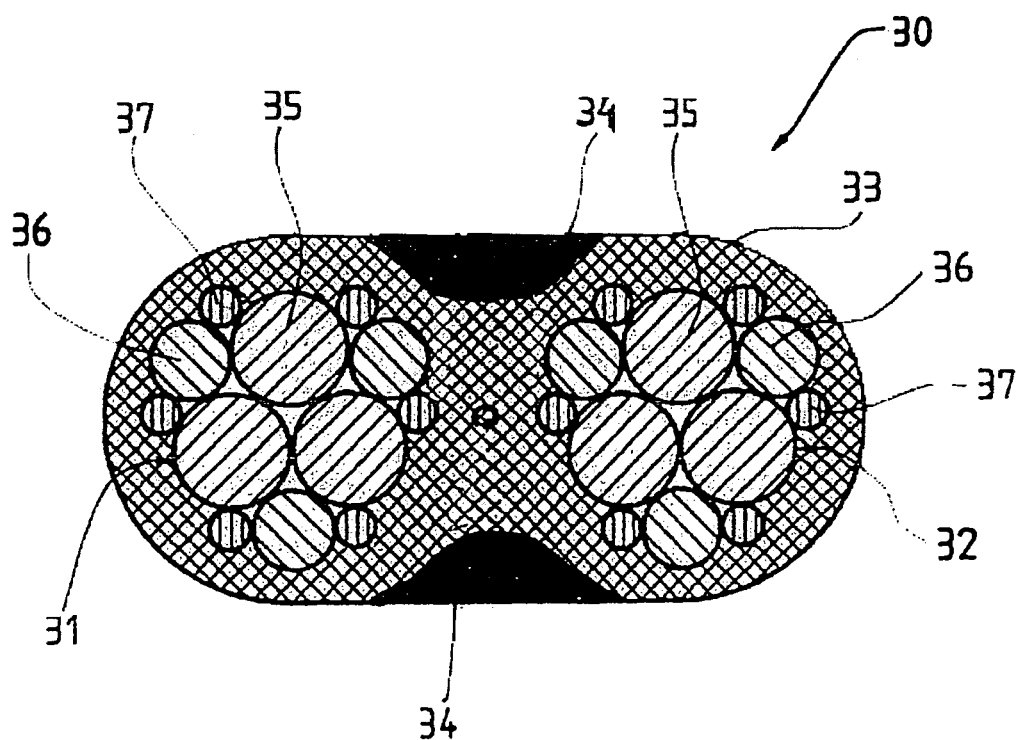
FIG. 3 is a cross section view of a second embodiment of a rope assembly of synthetic material in accordance with the present invention.

A second embodiment of the present invention is shown in FIG. 3 as a rope assembly of synthetic fiber 30 (twin rope) having two ropes 31, 32 stranded in opposed directions of rotation "S", "Z", and such ropes 31, 32 are firmly twisted and are fixed to each other in their parallel, separated position by a common rope sheathing 33. Apart from the different twist direction "S", "Z" of the ropes 31, 32, the twin rope 30 is constructed symmetrically to the rope longitudinal axis (the rope longitudinal axis extends perpendicularly to the drawing surface). The ropes 31 and 32 consist, in the shown example, of three groups of strands 35, 36, 37 of different diameters. The yarn number in all of the strands 35, 36, 37 of the rope of synthetic fiber 30 is equal and depends on the desired diameter of the rope 31, 32 to be manufactured. In the rope 31 of this embodiment example, three stands 35 with a "Z" twist are stranded to a rope core with an "S" twist. Around this rope core, an additional three strands 36 are stranded in parallel lay, which lays narrowly on the outer contour of the rope core. Finally, the gaps between the jointly stranded strands 35, 36 at the outer circumference of the rope 31 are filled with the strands 37 of the third group. These strands 37 are as well parallel and stranded on a helical line in the rope 31. The construction of the rope 32 differs when compared with the rope 31 exclusively by the respectively opposed directions of rotation or twist "S", "Z" of the aramide yarns and strands.

In accordance with the present invention, two oblong shaped, strip-like reinforcement elements 34 are provided, which extend parallel to the lengthwise direction of the rope assembly 30. The oblong reinforcement elements 34 form an integral component of the rope sheathing 33 and are in such a way, within the area of a fixed link, integrated into this rope sheathing such that the rope of synthetic fiber 30 exhibits essentially an oval cross section.

Figure 4:
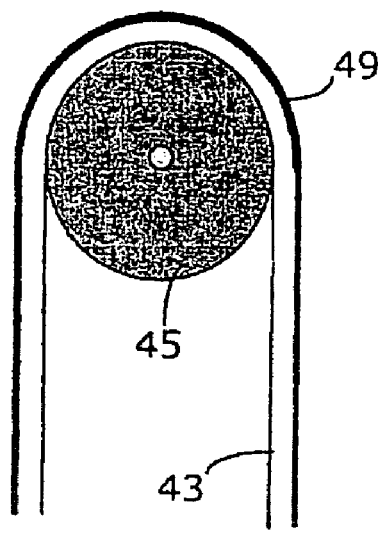
FIG. 4 is a schematic view of a pulley with a section of a rope assembly of synthetic material, in accordance with a third embodiment of the present invention, which includes a reinforcement element arranged on the outside.

A third embodiment of a rope of synthetic fiber in accordance with the present invention is shown in FIG. 4 wherein an oblong shaped reinforcement element 49 is provided, which is arranged on one side of a rope assembly of synthetic fiber 43 that exhibits the larger bending radius when rotating around a pulley 45 of an elevator installation. On this outside side of the rope assembly of synthetic fiber 43, the rope experiences, when rotating around the pulley 45, an extension that can be limited by the reinforcement element 49 to maximum tension values, which do not damage the rope 43. Such an embodiment with the one-sided arranged reinforcement element 49 is particularly suitable for an elevator installation with a 1:1 suspension, as shown for example in FIG. 1.

Figure 5:
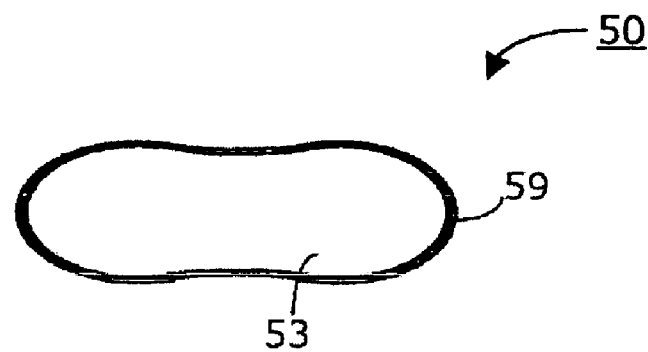
FIG. 5 is a cross-sectional view of a fourth embodiment of a rope assembly of synthetic material in accordance with the present invention.

In FIG. 5, a fourth embodiment of a rope assembly of synthetic fiber 50 is shown in cross section in which a reinforcement element 59 envelops, like a flexible tube-formed sheathing, the dumbbell-shaped rope sheathing of a rope 53. For the sake of simplicity, no details of a rope sheathing and an internal part of the rope 53 are shown in FIG. 5.

Figure 6:
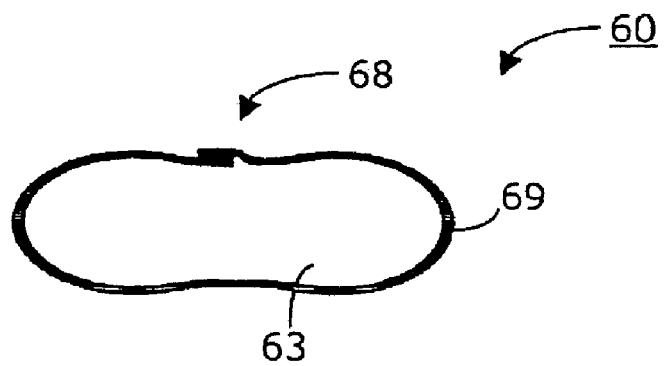
FIG. 6 is a cross-sectional view of a fifth embodiment of a rope assembly of synthetic material in accordance with the present invention.

In FIG. 6, a fifth embodiment of a rope assembly of synthetic fiber 60 is shown in cross section. A reinforcement element 69 is wrapped around and envelopes a dumbbell-shaped rope sheathing of a rope 63 with an overlapping 68 of edges, which overlapping extends along the entire longitudinal axis of the rope of synthetic fiber 60. For the sake of simplicity, no details of a rope sheathing and an internal part of the rope 63 are shown. The overlapping 68 is arranged preferably close to one of the recesses, which are to be found within the area of the fixed link. Thus, it is ensured that the overlapping 68 between the two dumbbell ends is recessed a little and is less exposed.

Figure 7:
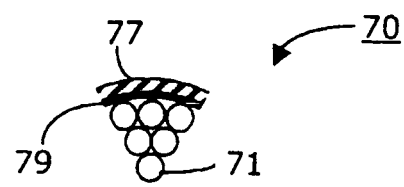
FIG. 7 is a cross-sectional view of a portion of a sixth embodiment of a rope assembly of synthetic material in accordance with the present invention.

In accordance with a sixth embodiment, which is shown in a partial sectional view in FIG. 7, a rope assembly of synthetic fiber 70 exhibits an internal construction with a plurality of fibers 71. These fibers 71 are enveloped by a reinforcement element 79. Preferably, the reinforcement element 79 is sprayed on, respectively extruded and afterwards compressed. Thus, the material of the reinforcement element 79 penetrates from the outside into all gaps between the fibers 71 at the outer circumference and fills them in. In this way, a close connection is ensured. The fibers 71 can also be covered with a fiber material, which then, after an impregnation process, constitutes the reinforcement element 79. The reinforcement element 79, on the other hand, is surrounded by the rope sheathing 77, which, preferably, exhibits a close connection with the reinforcement element 79.

Figure 8:
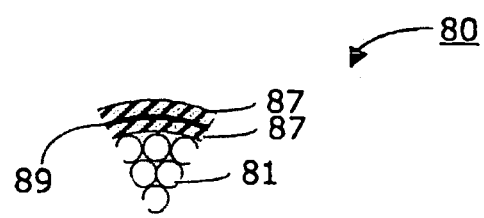
FIG. 8 is a cross-sectional view of a portion of a seventh embodiment of a rope assembly of synthetic material in accordance with the present invention.

In accordance with a seventh embodiment, which is shown in a partial sectional view in FIG. 8, a rope assembly of synthetic fiber 80 exhibits an internal construction with a plurality of fibers 81. These fibers 81 are surrounded by a rope sheathing 87, into which a reinforcement element 89 is integrated, embedded as a kind of separation layer. In this embodiment, it is advantageous if the rope sheathing 87 and the reinforcement element 89 enter into a close connection with one another.

Preferably, the reinforcement elements, shown in the above-described embodiments, are closely connected with the rope sheathing (as shown, for example, in the FIGS. 2 through 7) or form an integral component of the rope sheathing (as shown, for example, in FIG. 8), in order to guarantee when under load a better power transmission, respectively a better equilibrium of forces.

Preferably, the reinforcement element is oblong shaped and extends in the lengthwise direction along the rope sheathing.

In a further preferred form of the dumbbell-shaped sheathed rope of synthetic fiber, the reinforcement element is arranged within the fixed link, which extends between the parallel arranged and separated ropes.

In accordance with the present invention, more than two ropes can be arranged respectively at a distance from each other, preferably parallel to each other and sheathed by a rope sheathing with a reinforcement element.

In accordance with a further embodiment, the reinforcement element can comprise short pieces of fiber (e.g. glass fibers, aramide fibers or the like) that are integrated into the rope sheathing.

Further favorable embodiments are characterized by a reinforcement element that comprises a woven mat, which is preferably interlaced in different directions, or a fiber mat, which preferably exhibits non-directional fibers, or a meander-shaped hoop winding made of filaments, whereby the filaments are preferably arranged in different angles to each other. The reinforcement element can also comprise a plaited filament arrangement, whereby the filaments of the filament arrangement are loosely or tightly interlocked with each other.

In accordance with present invention, the rope sheathing can exhibit a dumbbell-shaped, a cylindrical, an oval, a concave, a rectangular or a wedge-shaped cross-sectional shape.

In a further embodiment, the reinforcement element is affixed in such a way that a certain fissuring (for example, by extension or fatigue) is registered in the rope sheathing. The reinforcement element prevents, however, the formation of deep fissures in the rope sheathing and as a result, it preserves the integrity of the rope as a whole. In order to control the fissuring, or respectively to limit their dimension, an embodiment of the kind shown in FIG. 8 is particularly suitable, in which the reinforcement element is arranged within the rope sheathing. The fissuring can be limited in that way to the outside layer of the rope sheathing.

Preferably, the reinforcement is in such a way displayed, in accordance with invention, that it does not form or hardly form reinforcement in the lengthwise direction. The longitudinal forces are to be taken up mainly by the synthetic fiber strands of the rope. Preferably, the reinforcement can be used, in accordance with invention, for an increase of the fatigue strength for completely reversed bending stress and/or the torsional strength.

The ropes of synthetic fiber, shown in the FIGS. 2 to 8, are particularly suited for operation through a pulley, whereby the power transmission between the pulley and the rope of synthetic fiber takes place essentially by frictional engagement.

The rope according to the present invention can be also applied to belt-like ropes of synthetic fiber, as is described in the following. Belt-like ropes of synthetic fiber are characterized by the fact that the power transmission takes place essentially by positive engagement. For this purpose, either the disk, around which rotates the belt-like rope of synthetic fiber, carries teeth, knobs or other out-standing elements, which engage into cooperating recesses of the belt-like rope of synthetic fiber, or the belt-like rope of synthetic fiber itself exhibits a number of teeth, knobs or other out-standing elements, which interact with recesses of a disk.

In accordance with present invention, a belt-like rope of synthetic fiber exhibits at least an oblong shaped reinforcement element. This reinforcement element exhibits either recesses, which can step into interaction with teeth, knobs or other out-standing elements of a disk, or the reinforcement element exhibits teeth, knobs or other out-standing elements, which can engage in an accordingly shaped disk.

Figures 9, 10:
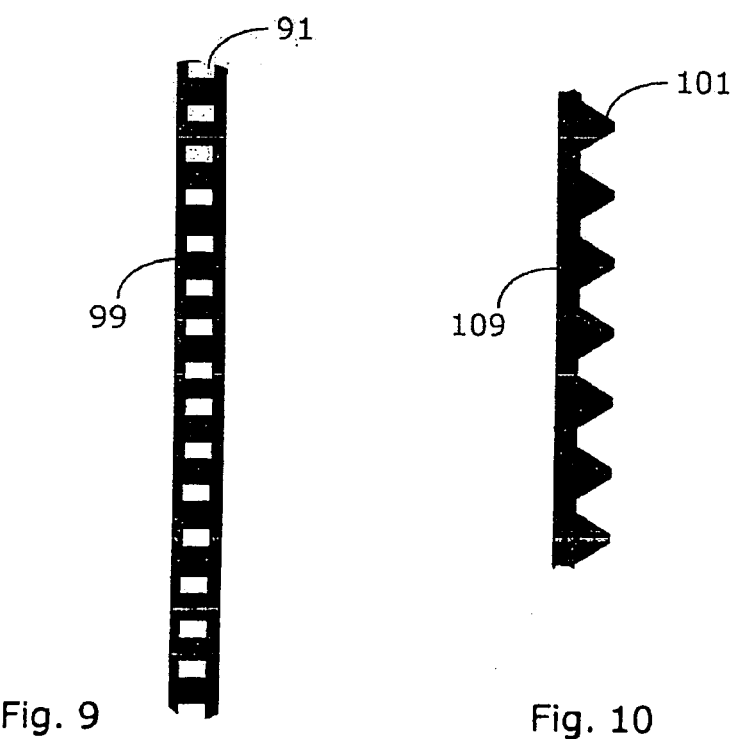
FIG. 9 is a side elevation view of a portion of a rope reinforcement element in accordance with the present invention.
FIG. 10 is a side elevation view of a portion of an alternate embodiment rope reinforcement element in accordance with the present invention.

A first oblong shaped reinforcement element 99 is shown in FIG. 9. The element 99 exhibits a number of evenly separated recesses 91. The reinforcement element 99 can be connected either closely with the rope sheathing of a rope of synthetic fiber, or it can be integrated into the rope sheathing, whereby the recesses 91 must however be open to and accessible from the outside. A second embodiment oblong shaped reinforcement element 109 is shown in FIG. 10. The element 109 exhibits a number of evenly separated teeth 101. The reinforcement element 109 can be connected either closely with the rope sheathing of a rope of synthetic fiber, or it can be integrated into the rope sheathing, whereby the teeth 101 extend outwardly from the rope sheathing.

The embodiments according to the present invention make it possible to increase the transverse resistance of the ropes of synthetic fiber. Thus, in particular, the reverse bending stress capacity can be improved. Fixed link breaches or weakening in the fixed link area can be avoided.

The invention can be generally employed for cranes and elevators, such as cranes, freight and passenger elevators, and also for machines by which the forces are transferred through ropes that can be driven.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A synthetic fiber rope assembly comprising:
   at least two ropes each formed of synthetic fiber strands and extending generally parallel in a lengthwise direction at a predetermined distance from each other;
   a rope sheathing having a fixed link attached to said at least two ropes and fixing said at least two ropes relative to each other in a firm torsional manner; and
   at least one reinforcement element attached to said rope sheathing for mechanically reinforcing said rope sheathing to improve a transverse resistance of said at least two ropes.

2. The rope assembly according to claim 1 wherein said at least one reinforcement element is an integral component of said rope sheathing.

3. The rope assembly according to claim 1 wherein said at least one reinforcement element has an oblong shape and extends in a lengthwise direction along said rope sheathing at said fixed link.

4. The rope assembly according to claim 1 wherein said at least one reinforcement element extends around and envelopes said rope sheathing.

5. The rope assembly according to claim 4 wherein said at least one reinforcement element is shaped as an elongated tube.

6. The rope assembly according to claim 4 wherein said at least one reinforcement element overlaps itself in the lengthwise direction.

7. The rope assembly according to claim 1 wherein said at least one reinforcement element is formed as a strip arranged at said fixed link.

8. The rope assembly according to claim 1 wherein said at least one reinforcement element is formed from short pieces of fiber integrated into said rope sheathing.

9. The rope assembly according to claim 1 wherein said at least one reinforcement element comprises at least one of: a woven mat; a fiber mat; a meander-shaped hoop winding made of filaments; and a plaited filament arrangement, whereby the filaments of the filament arrangement are loosely or tightly interlaced with each other.

10. The rope assembly according to claim 1 wherein said at least one reinforcement element is one of: arranged in an interior of the rope assembly between fibers of said ropes and said rope sheathing; arranged as coating within said rope sheathing; and
    arranged on said outer surface the rope assembly.

11. The rope assembly according to claim 1 wherein said at least one reinforcement element is formed of one aramide, polyester, glass fibers and carbon fibers.

12. The rope assembly according to claim 1 wherein said at least one reinforcement element has a plurality of positive power transmission elements formed as one of:
    recesses formed therein for interaction with teeth of a toothed pulley; and teeth formed thereon for interaction with recesses of a disk.

13. A synthetic fiber twin rope assembly comprising:
    two ropes each formed of a plurality of synthetic fiber strands and extending generally parallel in a lengthwise direction at a predetermined distance from each other;
    a rope sheathing enclosing said ropes, said rope sheathing having a fixed link attached to said ropes and fixing said ropes relative to each other in a firm torsional manner, said ropes and said rope sheathing exhibiting a dumbbell-shaped profile; and
    at least one reinforcement element attached to said rope sheathing and exposed at an outer surface of the rope assembly for mechanically reinforcing said rope sheathing to improve a transverse resistance of said two ropes.

14. The rope assembly according to claim 13 wherein said at least one reinforcement element is an integral component of said rope sheathing.

15. The rope assembly according to claim 13 wherein said at least one reinforcement element has an oblong shape and extends in a lengthwise direction along said rope sheathing at said fixed link.

16. The rope assembly according to claim 13 wherein said at least one reinforcement element extends around and envelopes said the rope sheathing.

17. The rope assembly according to claim 16 wherein said at least one reinforcement element is shaped as an elongated tube.

18. The rope assembly according to claim 16 wherein said at least one reinforcement element overlaps itself in the lengthwise direction.

19. The rope assembly according to claim 9 wherein said woven mat is interlaced in different directions.

20. The rope assembly according to claim 9 wherein said fiber mat exhibits non-directional fibers.

21. The rope assembly according to claim 9 wherein said meander-shaped hoop winding has said filaments arranged in different angles to each other.

22. A synthetic fiber rope assembly comprising:
at least two ropes each formed of synthetic fiber strands and extending generally parallel in a lengthwise direction at a predetermined distance from each other;
a rope sheathing forming a fixed link between said at least two ropes; and
at least one reinforcement element attached to said rope sheathing and exposed at an outer surface of the rope assembly for mechanically reinforcing said rope sheathing, said at least one reinforcement element being formed as a strip arranged at said fixed link.

23. A synthetic fiber rope assembly comprising:
at least two ropes each formed of synthetic fiber strands and extending generally parallel in a lengthwise direction at a predetermined distance from each other;
a rope sheathing forming a fixed link between said at least two ropes; and
at least one reinforcement element attached to said rope sheathing and exposed at an outer surface of the rope assembly for mechanically reinforcing said rope sheathing, said at least one reinforcement element having a plurality of positive power transmission elements formed as one of recesses formed therein for interaction with teeth of a toothed pulley, and teeth formed thereon for interaction with recesses of a disk.

* * * * *